(12) United States Patent
Pita-Gil et al.

(10) Patent No.: US 9,989,402 B1
(45) Date of Patent: Jun. 5, 2018

(54) METHOD FOR ESTIMATING THE WEIGHT OF A VEHICLE

(71) Applicant: Renault S.A.S., Boulogne-Billancourt (FR)

(72) Inventors: Guillermo Pita-Gil, Paris (FR);
Guillaume Martin, Versailles (FR);
Francois Desnoyer, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days. days.

(21) Appl. No.: 15/801,001

(22) Filed: Nov. 1, 2017

Related U.S. Application Data

(63) Continuation of application No. 14/418,594, filed as application No. PCT/FR2013/051783 on Jul. 24, 2013, now abandoned.

(30) Foreign Application Priority Data

Jul. 31, 2012 (FR) ..................................... 12 57425

(51) Int. Cl.
*G06K 9/00* (2006.01)
*G01G 19/02* (2006.01)
(Continued)

(52) U.S. Cl.
CPC ........... *G01G 19/022* (2013.01); *G01G 19/02* (2013.01); *G01G 23/01* (2013.01); *G01G 23/3735* (2013.01)

(58) Field of Classification Search
None
See application file for complete search history.

(56) References Cited

U.S. PATENT DOCUMENTS 6,249,735 B1 6/2001 Yamada et al.
8,087,301 B2 1/2012 Hammerschmidt
(Continued)

FOREIGN PATENT DOCUMENTS

DE 26 40 283 3/1978
FR 2 857 090 1/2005

OTHER PUBLICATIONS

Srivastava et al., "Standoff video analysis for the delecton of security anomalies in vehicles," AIPR, 2010 IEEE 39th.
(Continued)

*Primary Examiner* — Soo Park
(74) *Attorney, Agent, or Firm* — Oblon, McClelland, Maier & Neustadt, L.L.P.

(57) ABSTRACT

A method estimating weight of a motor vehicle including front and rear wheel assemblies using a smart communication device after loading the vehicle, including: (i) identifying the vehicle in the smart communication device; (ii) using a camera of the smart communication device, capturing and processing a photograph of at least one vehicle wheel after loading to determine displacement of a corresponding wheel assembly; (iii) using at least one accelerometer or inclinometer of the smart communication device, measuring at least one tilt angle of the vehicle after loading to determine displacement of the opposite wheel assembly and the corresponding wheel assembly; (iv) using a calculation unit of the smart communication device, calculating load values on the corresponding and opposite wheel assemblies based on respective displacements of the wheel assemblies, to determine a total load vehicle value; and (v) indicating by the smart communication device a vehicle load state to the user.

14 Claims, 5 Drawing Sheets

(51) Int. Cl.
*G01G 23/37* (2006.01)
*G01G 23/01* (2006.01)

(56) References Cited

U.S. PATENT DOCUMENTS

| | | |
|---|---|---|
| 8,736,458 B2 | 5/2014 | Reynolds |
| 9,500,550 B2 | 11/2016 | Wittmann |
| 2004/0199303 A1 | 10/2004 | Ohmura |
| 2009/0080703 A1 | 3/2009 | Hammerschmidt |
| 2011/0267200 A1 | 11/2011 | Reynolds et al. |
| 2014/0309845 A1 | 10/2014 | Wittmann |
| 2016/0305814 A1* | 10/2016 | Pita-Gil ................ G01G 19/02 |

OTHER PUBLICATIONS

Uchida et al., (JP 2002-087256), English translation attached.
International Search Report dated Oct. 22, 2013 in PCT/FR13/051783, filed Jul. 24, 2013.
French Search Report dated Aug. 1, 2013 in Application No. FR 1257425, filed Jul. 31, 2012.

\* cited by examiner

METHOD FOR ESTIMATING THE WEIGHT OF A VEHICLE

This application is a continuation of U.S. Ser. No. 14/418,594 filed Jan. 30, 2015, the entire content of which is incorporated herein by reference. U.S. Ser. No. 14/418,594 is a National Stage of PCT/FR2013/051783 filed Jul. 24, 2013, which claims priority under 35 U.S.C. 119 to France Application No. 1257425 filed Jul. 31, 2012.

The present invention relates in a general way to a method for estimating the total weight of a motor vehicle. More specifically, the invention relates to a method for estimating the total weight of a vehicle after loading.

A knowledge of the total weight of a motor vehicle is necessary for the correct operation of numerous on-board systems in the vehicle, such as shock absorber systems, underinflation detection systems, engine control systems (for electric, combustion or hybrid engines), hill starting systems, overload detection systems, lighting systems, braking and/or energy recovery systems, and the like.

At present, there are two groups of methods for evaluating the weight of a motor vehicle. A first group comprises direct systems, which use supplementary sensors such as ground to body clearance sensors, ground to axle clearance sensors, sensor bearings, and the like. A second group comprises indirect systems, which use only the sensors present in a vehicle to estimate the total weight of the vehicle. This family includes methods which, for example, estimate the weight using techniques of the recursive least squares type.

For example, FR 2 857 090 describes a method for estimating the total weight of a vehicle in which the weight of the vehicle is estimated by a recursive least squares algorithm. This method bases all the estimations on a single instant at a time. Problems arise with this estimation because of the number, complexity and dispersion of the various forces and vehicle parameters which are present in the vehicle dynamics equation and which must be estimated or have values assigned to them.

A similar approach is considered in U.S. Pat. No. 6,249,735. This document describes a method which uses measurements of the engine torque and the acceleration of the vehicle. The acceleration is calculated by discrete approximation of the derivative of the speed, and by filtering, which gives rise to problems of noise and has an effect on the accuracy and robustness of the estimation.

Furthermore, although methods which do not use the vehicle acceleration are less subject to noise, they do not take into account the gradient of the surface on which the vehicle is operated.

There is a further aspect of the problem, in that very high costs are incurred for both the direct solutions (for additional parts) and the indirect solutions (for adjustment and validation tests). Moreover, these systems are difficult to adjust and have low robustness.

One object of the present invention is to respond to the aforementioned drawbacks of the prior art documents, in the first place by proposing a method for estimating the weight of a motor vehicle after loading which will enable the user to detect overloading of his vehicle in a simple way without the need for supplementary sensors.

For this purpose, a first aspect of the invention relates to a method for estimating the weight of a motor vehicle comprising a front wheel assembly and a rear wheel assembly, using a smart communication device, after the loading of the vehicle, the method comprising the steps of: (i) identifying the vehicle in the smart communication device; (ii) using a camera of the smart communication device to capture and process a photograph of at least one wheel of the vehicle after loading to determine the clearance of the wheel assembly of the photographed wheel as a function of the identified vehicle; (iii) determining the clearance of the wheel assembly opposite the wheel photographed in step (ii), either by measuring the angle of inclination of the vehicle after loading, using at least one accelerometer or inclinometer of the smart communication device, or by capturing and processing a photograph of at least one wheel of the wheel assembly opposite the wheel assembly of the wheel photographed in step (ii), using the camera of the smart communication device; (iv) using a calculation unit of the smart communication device to calculate the load value on the wheel assembly of the photographed wheel and the load value on the opposite wheel assembly as a function of the respective clearances of these wheel assemblies, so as to determine the total load value of the vehicle; (v) using the smart communication device to inform the user of the load state of the vehicle.

This method for estimating the load of the vehicle can be very rapidly and easily executed by a user in possession of a smart communication device such as an intelligent mobile phone or computerized phone, also known as a "smartphone" in the English terminology, equipped with a suitable application. This solution is highly competitive in terms of cost, since it does not require any additional parts in the vehicle, and is reliable because it does not depend on any element in the vehicle. Thus it allows any user to check the load state of his vehicle after loading, and to prevent any risk of overload which may, notably, lead to excess consumption, degraded roadholding, or infringement of the safety regulations for the type of vehicle concerned (notably in terms of the gross vehicle weight rating or GVWR).

Advantageously, the vehicle comprises a loading space arranged at the rear of the vehicle, and the photographed wheel is a rear wheel of the vehicle, enabling the clearance of the rear wheel assembly to be determined, the opposite wheel assembly being the front wheel assembly. The photographing of the rear wheel increases the reliability of the measurement of the clearance of the rear wheel assembly for vehicles having a rear load space, since the load is essentially applied in this area. Advantageously, a photograph of each rear wheel of the vehicle is taken and processed, and the clearance of the rear wheel assembly is determined from the average clearance for each rear wheel photographed. This increases the reliability of the measurement of the clearance of the rear wheel assembly, particularly if the load is not distributed along the X axis of the vehicle.

According to an advantageous variant, step (v) of informing the user is executed by means of an illuminated and/or audible indicator at three levels, the first level corresponding to the information that the vehicle is overloaded relative to the permitted maximum, the second level corresponding to the information that there is a risk of overloading the vehicle relative to the permitted maximum, and the third level corresponding to the information that the load is below the permitted maximum. For example, a red display will indicate overloading of the vehicle, an orange display will indicate a risk of overload, and a green display will indicate a permitted loading level.

According to another advantageous variant, step (ii) of taking a photograph of a wheel is dependent on the vertical positioning of the smart communication device, detected by means of an accelerometer. The detection of the vertical positioning of the smart communication device during the taking of a wheel photograph simplifies the processing, by avoiding problems of parallax in the image and increasing the reliability in terms of the value of the clearance of the wheel assembly of the photographed wheel.

According to another advantageous variant, step (i) of identifying the vehicle comprises the steps of: (i.1) determining, before loading, the distance between the wheel center and the center of the wheel housing of the wheel to be photographed in step (ii); (i.2) determining the angle of inclination of the vehicle before loading; (i.3) determining the total permissible load of the identified vehicle. This initial step of identifying the vehicle increases the reliability of the weight estimation, while simplifying the calculations in the subsequent steps. Step (i.3) is also essential in cases in which the vehicle to be weighed is not parked on a flat surface in the terrestrial reference frame.

According to another advantageous variant, step (ii) of image processing comprises the following substeps of: (ii.0) taking a photograph of a wheel of the vehicle; (ii.1) converting the captured photograph of the wheel to a grayscale image; (ii.2) using a first filter of the fuzzy Gaussian type to improve the sharpness of the image; (ii.3) using a second filter of the Sobel type to obtain the contours of the image; (ii.4) breaking down the image into two parts, namely a first part relating to the wheel and a second part relating to the wheel housing; (ii.5) calculating the center and the radius of the wheel housing by the least squares method; (ii.6) calculating the values of the minimum and maximum radii of the wheel as a function of the radius of the wheel housing and of the identified vehicle; (ii.7) using a third filter of the Mexican hat wavelet type to improve the concentration of points near the center of the wheel; (ii.8) calculating the center of the wheel on the basis of the accumulation of points in the wheel center, and calculating the distance after loading between the wheel center and the center of the wheel housing; (ii.9) calculating the clearance of the wheel assembly of the photographed wheel, using the difference in distance between the wheel center and the center of the wheel housing after and before loading.

This image processing method is highly reliable if the vehicle is correctly identified at the outset. Notably, it can be used for the precise detection of the radius of the wheel housing and the minimum and maximum wheel radii, as well as the center of the wheel and the center of the wheel housing.

According to another advantageous variant, step (iii) of determining the clearance of the opposite wheel assembly is based on a measurement of the difference in the angle of inclination before and after loading, the angle of inclination being chosen as the angle between a terrestrial reference frame and a vehicle reference frame along the X axis of the vehicle. In particular, this step of determining the clearance by measuring the angle of inclination is particularly simple and reliable for the wheel assembly opposite the load space. Advantageously, during step (iii) of measuring the angle of inclination, any detection of an acceleration beyond a certain predetermined threshold is considered to indicate that the smart communication device has been dropped, and step (iii) must be repeated. This variant can be used to prevent an unrealistic measurement of the angle of inclination caused by the dropping of the device.

According to another advantageous variant, step (iv) of calculating the load value on the front and rear wheel assemblies is executed by interpolation in a load/clearance map. This map is plotted for each vehicle model and must be correctly identified at the start of the application. It enables the load value on the wheel assembly concerned to be determined in a direct and simple manner, without the need for calculation.

A second aspect of the invention relates to a smart communication device for the execution of the method according to the first aspect of the invention, characterized in that the smart communication device comprises an application programmed to activate a method for estimating the weight of a vehicle, means for identifying the vehicle, a camera for taking a photograph of at least one wheel of the vehicle, at least one accelerometer and/or inclinometer for measuring an angle of inclination between the terrestrial reference frame and the vehicle reference frame, a calculation unit programmed to execute steps of image processing and calculation of clearance values and load values, and at least one graphic and/or audio interface to alert the user to the load state of his vehicle.

A third aspect of the invention relates to an application for a smart communication device according to the second aspect of the invention, for the execution of the method according to the first aspect, characterized in that it comprises the following steps from the viewpoint of the user of the application: a) identifying the user's vehicle; b) taking a photograph of at least one wheel indicated by the application; c) placing the smart communication device in a docking station of the vehicle and validation after this placement; d) informing the user of the load state of the vehicle.

Other features and advantages of the present invention will be more evident from a reading of the following detailed description of an embodiment of the invention, provided by way of non-limiting example and illustrated in the appended drawings, in which.

Figure 1:
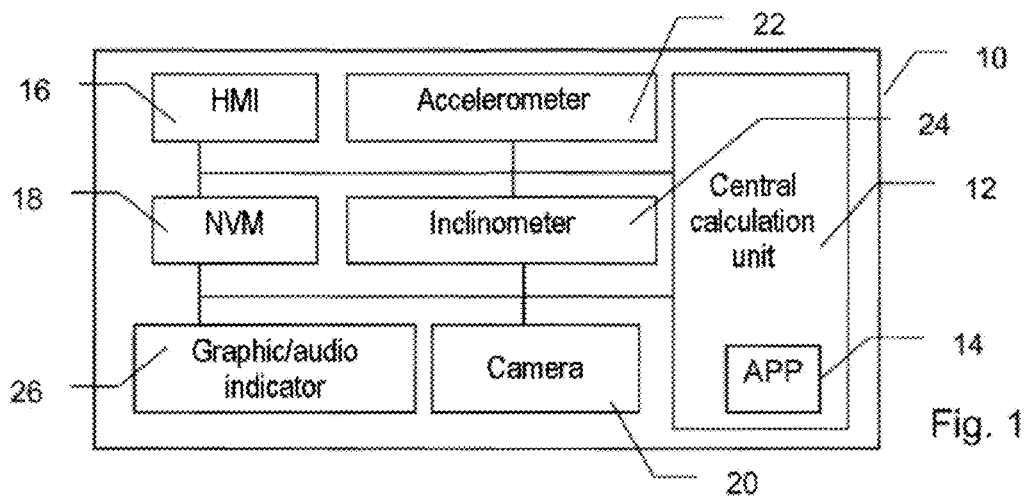
FIG. 1 is a schematic representation of a smart communication device according to an embodiment of the invention.
Figure 6:
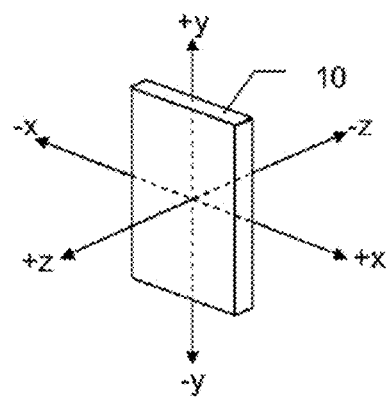
FIG. 6 shows an example of the definition of the axes for a smart communication device.

FIG. 1 is a schematic representation of a smart communication device according to an embodiment of the invention. The smart communication device 10 comprises a programmable central unit 12. An application 14 for estimating the weight of a vehicle is programmed into this central unit 12. A human-machine interface 16 is used to start the application 14 for estimating the weight of a vehicle. Means for identifying the vehicle are provided, for example, in the form of the selection, via the human-machine interface 16, of a vehicle model from a list of models recorded previously in a non-volatile memory 18. A camera 20 is also provided, for taking a photograph of at least one wheel of the vehicle, together with at least one accelerometer 22 and/or an inclinometer 24 for measuring the angle of inclination of the smart communication device, the central unit 12 being programmed to execute steps of image processing and calculation of clearance values and load values. At least one graphic and/or audio interface 26 is also provided, to alert the user to the load state of his vehicle. This graphic and/or audio interface 26 may be partially or completely connected to the human-machine interface 16. For information, the axes x, y and z as generally defined for a communication device of this kind are shown in FIG. 6.

Figure 2:
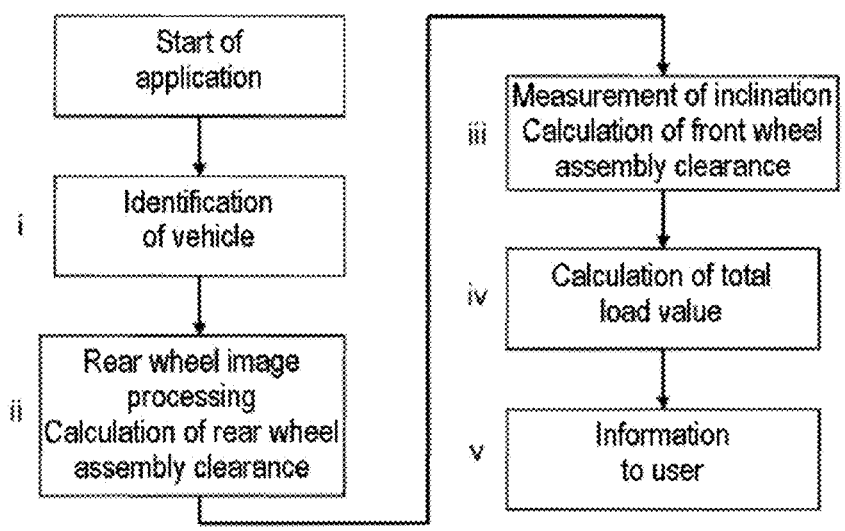
FIG. 2 shows a diagram of the method for estimating the weight of a vehicle according to an embodiment of the invention.

FIG. 2 shows a diagram of the method for estimating the weight of a vehicle according to an embodiment of the invention. A preliminary step is that of starting the application for estimating the load of a vehicle.

When the application has been started, the user must identify his vehicle in a first step (i) so that the weight of the vehicle can be estimated. For this purpose, he may, for example, be invited via the human-machine interface to select his vehicle model from a previously recorded list. The previously recorded vehicle model must include at least the information relating to the distance between the wheel center and the center of the wheel housing of the wheel to be photographed (step i.1), together with the total permissible load for this model of vehicle (step i.3). Alternatively, the distance between the wheel center and the center of the wheel housing of the wheel to be photographed (step i.1) may be determined manually by taking a photograph of a wheel of the vehicle before loading, the subsequent processing of which will be similar to that explained in detail in FIG. 4 in respect of steps (ii.1) to (ii.8). Additionally, the identification of the vehicle may include the determination of an angle of inclination of the vehicle before its loading (step i.2). This measurement of inclination will preferably be made along the X axis of the vehicle, that is to say along the longitudinal axis of the vehicle, between the terrestrial reference frame (based on gravity) and the vehicle reference frame (based on the vehicle). To this end, the smart communication device will preferably be positioned in a location in the vehicle provided for this purpose, for example in the form of a docking station having a known orientation.

In a second step (ii), the user is invited to take a photograph of at least one wheel of his vehicle after loading. Preferably, the user is invited to take a photograph of a wheel located at the load space end. Thus, for most vehicles, the load space is located at the rear of the vehicle, and the user will therefore be invited to take a photograph of a rear wheel of his vehicle. This photograph is then processed by an image processing method described in detail with reference to FIG. 4. On the basis of the image processing that is executed, the application determines the clearance of the wheel assembly of the photographed wheel, which, as a general rule, will be the clearance of the rear wheel assembly.

In a third step (iii), the user preferably positions the smart communication device in his docking station to make at least one measurement of the inclination of the vehicle along the X axis between the terrestrial reference frame and the vehicle reference frame after the loading of the vehicle. For this purpose, provision is made to position the communication device correctly in its location, to ensure that the measured inclination is indeed the inclination along the X axis of the vehicle. If a similar measurement has been made before loading, during the identification of the vehicle, it will be possible to calculate the precise difference in inclination before and after loading, so as to compensate for any gradient in the ground on which the vehicle is parked while being loaded. On the basis of the inclination measured after loading, and advantageously both before and after loading, the application determines the clearance of the wheel assembly opposite that of the photographed wheel, for example the front wheel assembly.

In a fourth step (iv), the application calculates the load value on the front and rear wheel assemblies of the vehicle, from which it deduces the total load value of the vehicle by adding the two loads together. This total load value can then be displayed by the communication device.

In a fifth step (v), the application operates the graphic and/or audio interface of the communication device to alert the user to the load state of his vehicle. Thus, for example, the communication device displays a red alert if the weight is more than 0.95*maxweight, where "maxweight" is a calibration constant corresponding to the maximum permitted load. The device displays a yellow alert if the weight is in the range from 0.8*maxweight to 0.95*maxweight. The device displays a green alert if the weight is below 0.8*maxweight. The levels 0.8 and 0.95 are two thresholds which are also calibration parameters. Clearly, they may be modified to meet requirements. The number of alert levels may be variable and may depend on the type of application. It is also possible to display the probability of overload, or the load and the confidence level at 95% or 99%, for example.

Figure 3:
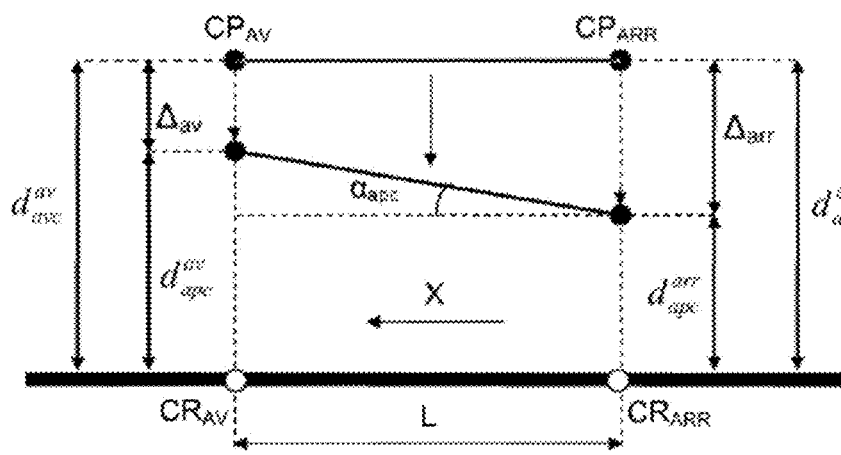
FIG. 3 is a schematic representation of the clearance of the front and rear wheel assemblies after the loading of the vehicle.

FIG. 3 is a schematic representation of the clearance of the front wheel assembly $\Delta_{AV}$ and rear wheel assembly $\Delta_{ARR}$ after the loading of the vehicle. In the example shown in the figure, the vehicle is parked on horizontal ground. The vehicle is represented schematically by two points representing the front wheel center $CR_{AV}$ and rear wheel center $CR_{ARR}$ of the vehicle, and by the front wheel housing center $CP_{AV}$ and the rear wheel housing center $CP_{ARR}$ of the vehicle, these points being used to determine the clearances of the wheel assemblies of the vehicle. However, it will be evident that points on the vehicle other than the centers of the wheel housings can be considered, where these other points are subject to being pushed inward together with the wheel suspension when the vehicle is loaded. The distance between the front wheel center $CR_{AV}$ and rear wheel center $CR_{ARR}$ of the vehicle is the wheelbase L of the vehicle.

Additionally, the term "clearance" will generally be taken to mean the distance corresponding to the vertical oscillation of an axle with respect to the chassis, due to the flexibility of the suspension during loading. In the remainder of this example, the clearance will signify the vertical oscillation of the center of the wheel housing with respect to the corresponding wheel center.

Before loading, the identification makes it possible, notably, to determine the distance at the rear before loading $d_{avc}^{aar}$ between the wheel center $CR_{ARR}$ and the wheel housing center $CP_{ARR}$, particularly in the case where the load space is located at the rear of the vehicle, and, if required, the angle of inclination along the X axis of the vehicle between the terrestrial reference frame and the vehicle reference frame, if this angle is not zero. This measurement may be automatically made and recorded by the smart communication device if the latter detects a non-zero inclination during the initial identification step.

During step (iii), which is detailed below with reference to FIG. 4, the communication device determines the distance at the rear after loading $d_{apc}^{arr}$ between the wheel center $CR_{ARR}$ and the center of the wheel housing $CP_{ARR}$ which has been pushed inwards.

During step (iv), the communication device calculates the clearance of the wheel assembly opposite the photographed wheel, that is to say the front wheel assembly in the present example. To this end, the communication device is preferably placed in the docking station provided for this purpose in the vehicle. When the communication device is in the predetermined position, it can make a measurement of the inclination of the vehicle either automatically or manually (that is to say, by the user's action). Thus, for example, during three seconds the communication device averages the three components measured by its accelerometer. The values gxiPh, gyiPh and gziPh are obtained. If the communication device falls down during the three seconds of measurement, at least one of the acceleration components exceeds 1.5 g, and it is then considered that the device has moved and the measurement will have to be repeated. The same procedure can be followed if one of the angular velocities exceeds the threshold of 0.1 rad/s in absolute value. Advantageously, the communication device displays a progress bar during the measurement. During this measurement, it must also check that the communication device is being held in the correct direction, which may be indicated by a negative value of the parameters gyiPh and gziPh.

When the calculation has finished, the communication device estimates the angle of inclination after loading $a_{apc}$ along the X axis of the vehicle between the terrestrial reference frame and the vehicle reference frame, by calculating, for example:

$$\alpha_{apc} = 0.5(a\cos(|gyiPh|) + a\sin(|gziPh|))$$

The communication device then deduces the distance at the front $d_{apc}^{av}$ after loading between the wheel center $CR_{AV}$ and the wheel housing center $CP_{AV}$ which has been pushed inwards, using the following formula:

$$d_{apc}^{av} = d_{apc}^{arr} + L \cdot \tan(\alpha_{apc})$$

If the gradient of the ground is to be taken into account, the following general formula may be used:

$$d_{apc}^{av} = d_{apc}^{arr} - L \cdot \tan(\Delta\alpha)$$

where $\Delta\alpha = \alpha_{avc} - \alpha_{apc}$, $\alpha_{avc}$ being the inclination before loading, defined during the identification of the vehicle. L is the wheelbase of the vehicle, also defined during the identification of the vehicle.

Figure 4:
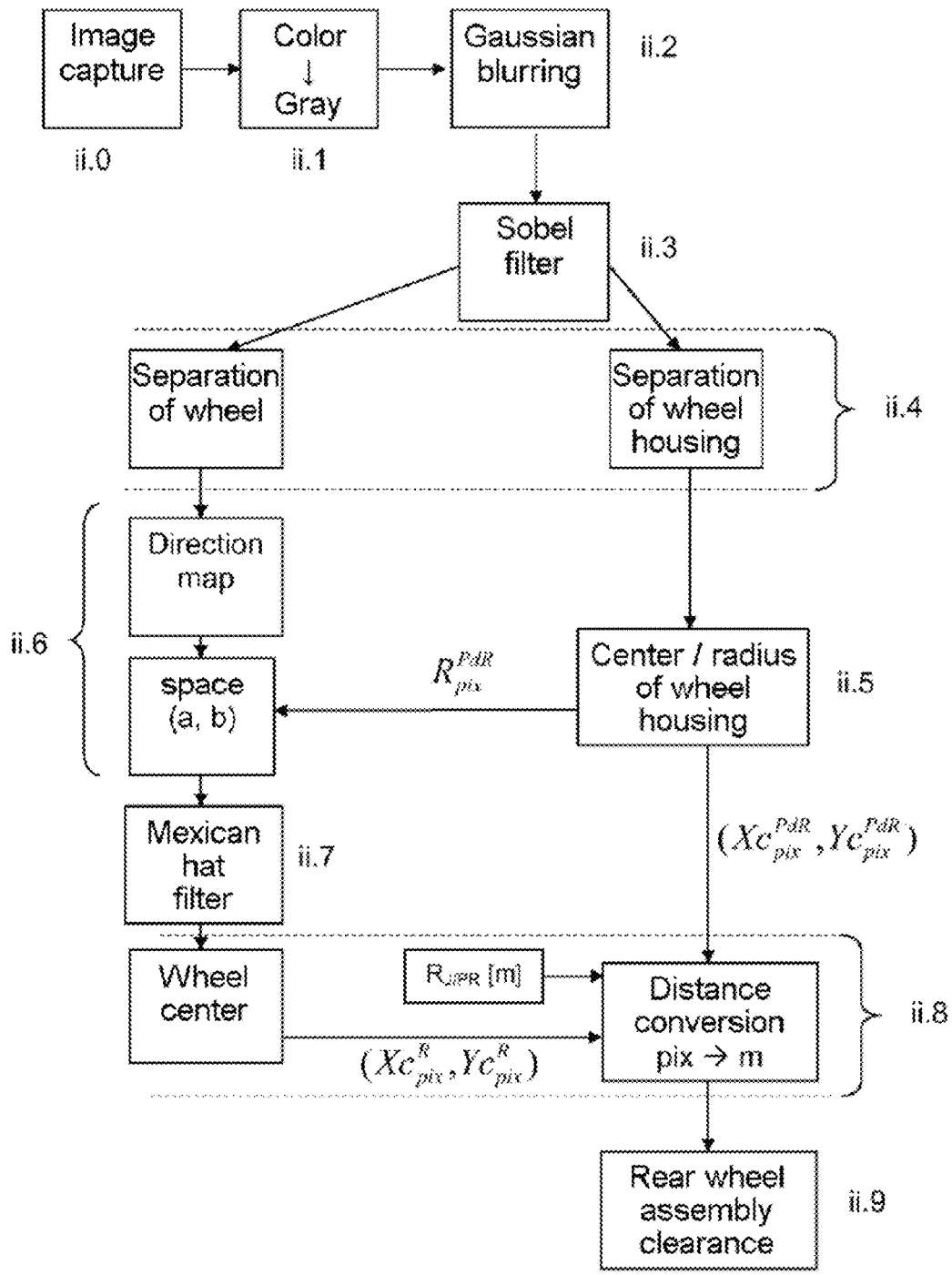
FIG. 4 shows a detailed diagram of the step of image processing according to an embodiment of the invention.

FIG. 4 shows a detailed diagram of step (ii) of image capture and processing according to a preferred embodiment of the invention.

As mentioned above, the user is invited by the application to take a photograph (step ii.0) of at least one wheel of his vehicle, for example a rear wheel. The photograph is preferably taken in conditions in which the communication device is "upright", that is to say when the measurements of the accelerometers contained in it indicate x and z components close to zero and a y component of less than zero (the telephone is not upside down). Components x, y and z of the smart communication device are shown in FIG. 6.

An illuminated and/or audible and/or vibration signal may inform the user that these conditions are present, so that he can initiate the photograph capture. In a variant, automatic capture of the photograph may be provided when the conditions are met.

The communication device then commences the processing of the photograph of the rear wheel taken by the user, enabling the clearance of the corresponding suspension to be calculated. When the photograph has been taken, if the communication device does not allow the grayscale photograph to be taken directly, the photograph is converted to grayscale (step ii.1, only if necessary). This conversion may be carried out, for example, with the following weights applied at each RGB level of the signal:

gray_image=0.3*photo_red+0.59*photo_green+ 0.11*photo_blue;

where photo_red is the red luminous intensity, photo_green is the green luminous intensity, and photo_blue is the blue luminous intensity. When the image has been converted to grayscale, the processing starts with blurring of the image with a Gaussian filter (step ii.2). This processing enables artificial image gradients, defects, and the like to be reduced.

Figure 4A:
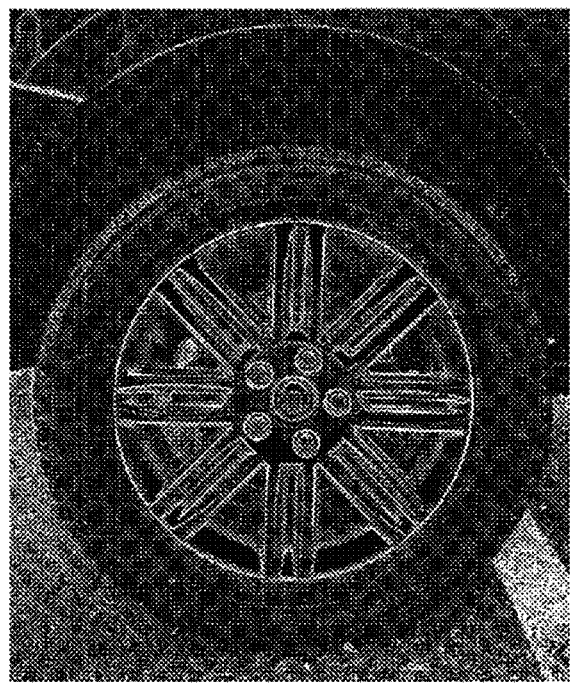
FIGS. 4A-4D show some substeps of the image processing performed.

"Sobel" filtering is then applied (step ii.3) to calculate the derivative of the image in the direction of the width and of the height, and then in both directions combined. This processing enables the contours present in the image to be obtained (see FIG. 4A).

The image is then broken down into two parts, namely the wheel housing and the wheel (step ii.4).

Figure 4B:
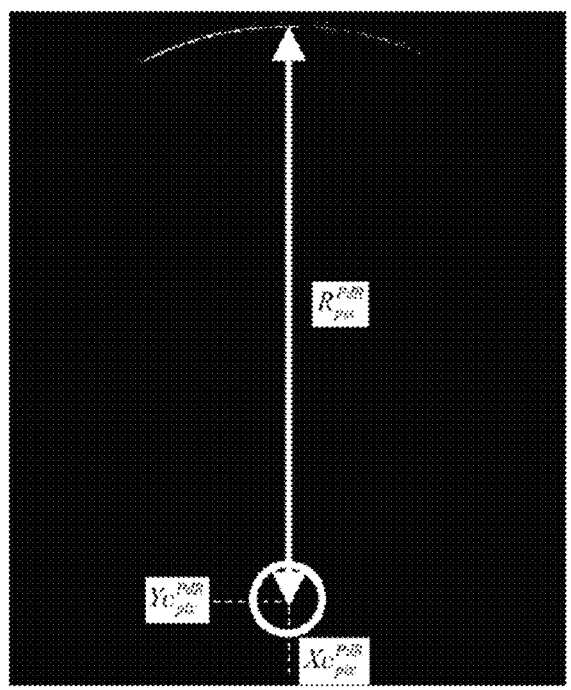

For the separated wheel housing, the circle containing the points forming the contour is calculated by the least squares method (step ii.5). Thus the center $(Xc_{pix}^{PdR}, Yc_{pix}^{PdR})$ and the radius $R_{pix}^{PdR}$ of the wheel housing in pixels are found (see FIG. 4B).

Figure 4C:
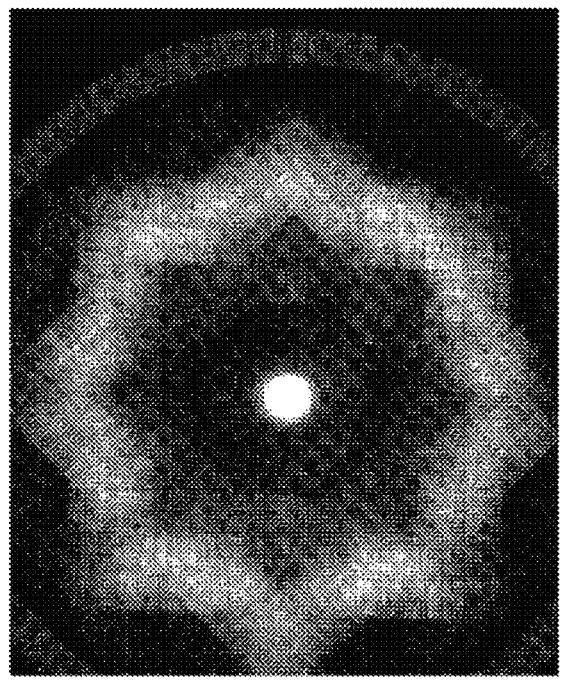

For the separated wheel, the first stage is the calculation of the direction map, which is a matrix containing the directions normal to the intensity gradient calculated during the Sobel filtering. The points in the direction indicated by this vector, the distance of which varies from r_min to r_max, are then cumulated in the image. These values r_min and r_max are calculated (step ii.6) using the value of the radius $R_{pix}^{PdR}$ of the wheel housing estimated in the preceding step in pixels and the theoretical ratio $R_{J/PR}$ (known) between the rim radius and the radius of the wheel housing (see FIG. 4C).

Figure 4D:
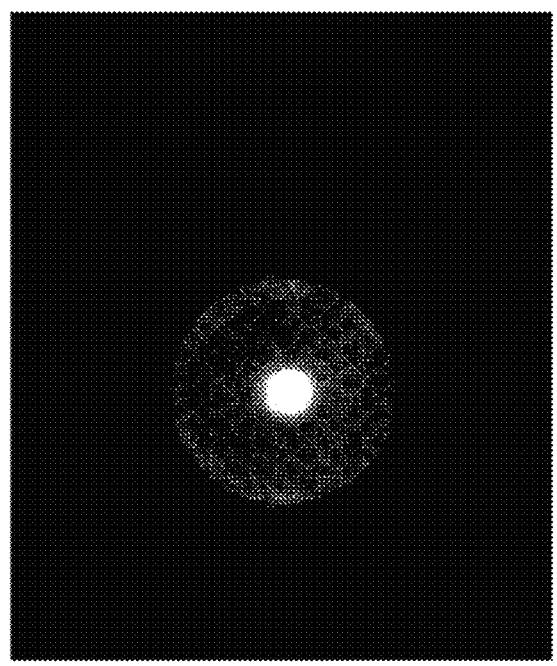

The processing is continued by filtering the resulting image with a Mexican hat filter or a Mexican hat wavelet filter (step ii.7), similar to a cardinal sine. This makes it possible to improve the concentration of points near the center of the wheel (see FIG. 4D).

The center of the wheel $(Xc_{pix}^R, Yc_{pix}^R)$ is then calculated (step ii.8) on the basis of the accumulation of points in the wheel center.

In the context of the present invention, other forms of image processing may be used to define both the wheel center and the wheel housing center.

To complete the processing, the distance in pixels between the wheel center and the wheel housing center is calculated, after which it is converted into meters, using the ratio between the radius of the wheel housing in pixels and in meters (the theoretical radius). The experimental results are shown in FIG. 5B. The result of the calculations is the distance $d_{apc}^{arr}$ between the wheel center and the wheel housing center after loading. This distance decreases with an increase in the loading of the vehicle.

Therefore, an initial step of calibration in the factory makes it possible to plot a map showing this distance $d_{apc}^{arr}$ as a function of a known weight of the vehicle, and subsequently to determine this weight by estimating $d_{apc}^{arr}$.

More advanced versions of the application can be imagined, in which the user is requested to photograph both rear wheels in order to calculate a distance $d_{apc}^{arr}$ which is the average of the two wheels.

However, in order to allow for ageing, and notably the phenomena of creep in the linkage between the chassis and the suspensions, the application subsequently deduces (step ii.9) the clearance of the rear wheel assembly by performing the following operation $$\Delta d_{arr} = d_{avc}^{arr} - d_{apc}^{arr}$$

where $d_{avc}^{arr}$ represents the front distance before loading (in the empty state). This value will be deduced during the stage of vehicle identification: for example, either by asking the user to photograph the vehicle in the empty state, or by accessing a database and interrogating it with the vehicle identifier.

The user may also be requested to photograph the vehicle regularly in the empty state (once or twice a year, for example), in order to allow for variations in this empty distance, due essentially to the ageing of the various members of the suspension.

Figure 5A:
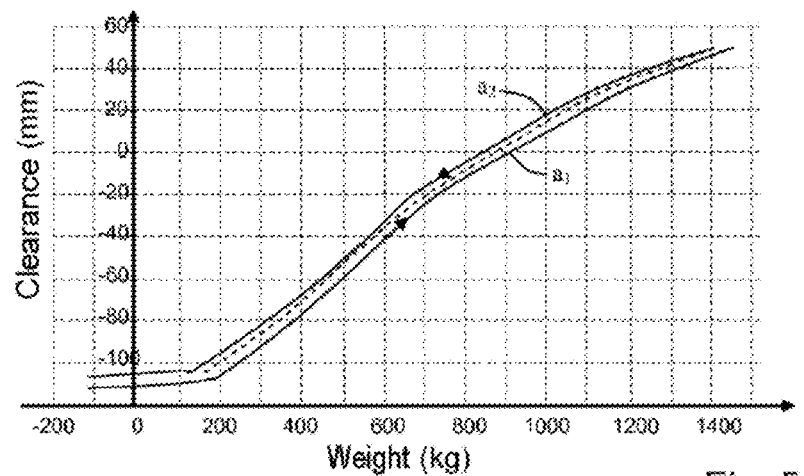
FIG. 5A shows an example of the load/clearance relationship for a wheel suspension for a predetermined vehicle model.
Figure 5B:
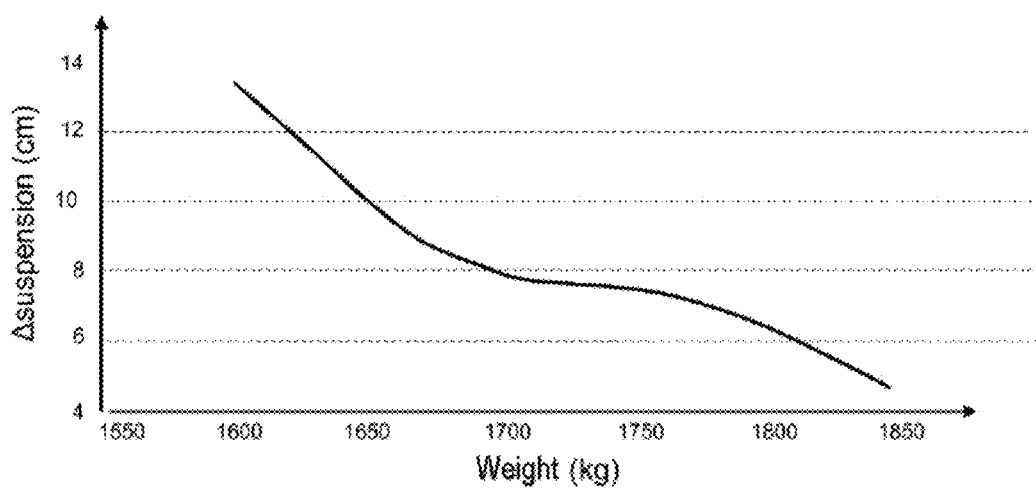
FIG. 5B shows the experimental results of the determination of the total load of a vehicle.

FIG. 5A shows an example of the load/clearance relationship of a wheel suspension for a predetermined vehicle model. The rear clearance value found on completion of processing step (ii) can be used during the step to calculate, by interpolation in a map (such as that shown in FIG. 5A, for example), the value of the loading on the rear wheel assembly.

This figure exhibits hysteresis: when the vehicle is progressively loaded, the clearance follows the curve $a_1$, whereas the relationship follows the curve $a_2$ when the vehicle is unloaded.

To limit the uncertainties, the median curve, shown as a broken line, is used.

According to another embodiment of the invention, the user is requested to photograph the four wheels of the vehicle, enabling the precision of the weight estimation to be increased, notably by improving the evaluation of the loading conditions.

The photographing of each of the wheels and the image processing as defined, or any other image processing that results in the determination of the wheel centers and wheel housing centers, then enables the clearance of each wheel to be determined for each wheel assembly. During the identification of the vehicle, if it is specified that the clearance of each wheel is to be determined, making it necessary to photograph each of the wheels, it is no longer necessary to determine the angles of longitudinal and transverse inclination of the vehicle, since the unloaded clearance of each wheel is then solely dependent on the known characteristics of the vehicle, and on the gradient of the road, which can therefore be easily determined, by interpolation of the known clearances on flat ground, for example.

A simplified variant is that of measuring only one of the wheels in each wheel assembly for the determination of the clearance of the wheel assemblies.

Clearly, various modifications and/or improvements which will be evident to those skilled in the art may be made to the different embodiments of the invention described in the present description, without departing from the scope of the invention defined by the attached claims.

Notably, the identification of the vehicle may be used on the use of the VIN (for "Vehicle Identification Number"), which is the unique alphanumeric code assigned to each vehicle. If the VIN is used, the parameters required for the various calculations can be obtained from a central server.

This VIN could be obtained by a request sent by the smart communication device to the vehicle, for example via the OBD (On Board Diagnostic) diagnostic interface, and the response could then be transmitted in its turn to a database, which would return the parameters required for the various calculations.

Additionally, in order to improve the precision of the device, during the vehicle identification step (step (iii)), in which the user is requested to position the smart communication device in his docking station to make at least one measurement of the inclination of the vehicle along the X axis between the terrestrial reference frame and the vehicle reference frame before the loading of the vehicle, provision is also advantageously made to determine the inclination along the Y axis of the vehicle (the transverse inclination) in order to correct the subsequent determination of the distance between the wheel housing center and the wheel center for this inclination.

Advantageously, provision is also made, during the determination of the inclination after loading along the X axis, to determine the inclination along the Y axis, this determination being advantageously coupled with the measurement of a single wheel of each wheel assembly.

Thus the difference in inclination is measured with even greater precision.

The inclination of the vehicle along the Y axis may be due to the banking of the ground, or may occur when the vehicle is parked with one of the wheels, or both wheels on one side, placed on a sidewalk, while the other two wheels are on the road.

The invention claimed is:

1. A method for estimating weight of a motor vehicle including a front wheel assembly and a rear wheel assembly, using a smart communication device, after loading of the vehicle, the method comprising:
   identifying the vehicle in the smart communication device;
   capturing and processing, using a camera of the smart communication device, a photograph of at least one wheel of the vehicle after loading to determine clearance of the wheel assembly of the photographed wheel as a function of the identified vehicle;
   determining clearance of the wheel assembly opposite the photographed wheel by measuring a difference in an angle of inclination of the vehicle before and after loading using at least one accelerometer or inclinometer of the smart communication device, the smart communication device being located within the vehicle before and after the loading;
   calculating, via processing circuitry, a load value on the wheel assembly of the photographed wheel and a load value on the opposite wheel assembly as a function of respective clearances of the wheel assemblies to determine a total load value of the vehicle;
   providing, via the processing circuitry, a load state of the vehicle to a user.

2. The method for estimating the weight of a vehicle as claimed in claim 1, wherein the vehicle includes a load space arranged at a rear of the vehicle, the photographed wheel is a rear wheel of the vehicle enabling clearance of the rear wheel assembly to be determined, and the opposite wheel assembly is the front wheel assembly.

3. The method for estimating the weight of a vehicle as claimed in claim 2, further comprising:
   capturing and processing a photograph of each rear wheel of the vehicle is taken; and
   determining clearance of the rear wheel assembly from an average clearance for each photographed rear wheel.

4. The method for estimating the weight of a vehicle as claimed in claim 1, wherein the processing circuitry provides the load state via an illuminated and/or audible indicator at three levels, a first level corresponding to information that the vehicle is overloaded relative to a permitted maximum, a second level corresponding to information that there is a risk of overloading the vehicle relative to the permitted maximum, and a third level corresponding to information that the total load value is below the permitted maximum.

5. The method for estimating the weight of a vehicle as claimed in claim 1, wherein capturing a photograph of a wheel is dependent on vertical positioning of the smart communication device as detected by an accelerometer.

6. The method for estimating the weight of a vehicle as claimed in claim 1, wherein identifying the vehicle includes
   determining, before loading, a distance between a wheel center and a center of a wheel housing of the photographed wheel,
   determining the angle of inclination of the vehicle before loading,
   determining a total permissible load of the identified vehicle.

7. The method for estimating the weight of a vehicle as claimed in claim 6, wherein capturing and processing the image includes
   converting the taken photograph of the wheel to a grayscale image,
   improving sharpness of the image using a first filter of fuzzy Gaussian type,
   obtaining counters of the image using a second filter of Sobel type,
   breaking down the image into two parts, a first part relating to the wheel and a second part relating to the wheel housing,
   calculating a center and radius of the wheel housing by least squares methodology,
   calculating values of the minimum, and maximum radii of the wheel as a function of the radius of the wheel housing and of the identified vehicle,
   improving concentration of points near the center of the wheel using a third filter of Mexican hat wavelet type,
   calculating the center of the wheel on the basis of accumulation of points in the wheel center,
   calculating the distance after loading between the wheel center and the center of the wheel housing, and
   calculating the clearance of the wheel assembly of the photographed wheel using the difference in distance between the wheel center and the center of the wheel housing before and after loading.

8. The method for estimating the weight of a vehicle as claimed in claim 6, wherein the angle of inclination being chosen as the angle between a terrestrial reference frame and a vehicle reference frame along the axis of the vehicle.

9. The method for estimating the weight of a vehicle as claimed in claim 8, wherein, during measuring the angle of inclination, the processing circuitry determines that the smart communication device has been dropped and must repeat the measuring of the angle of inclination when the processing circuitry detects any detection of an acceleration beyond a certain predetermined threshold.

10. The method for estimating the weight of a vehicle as claimed in claim 1, wherein calculating the load value on the front and rear wheel assemblies is executed by interpolation in a load/clearance map.

11. The method for estimating the weight of a vehicle as claimed in claim 1, further comprising:
    determining clearance of the wheel assembly opposite the photographed wheel by capturing and processing a second photograph of at least one wheel of the wheel assembly opposite the wheel assembly of the photographed wheel using the camera of the smart communication device.

12. The method for estimating the weight of a vehicle as claimed in claim 1, wherein the determining determines the clearance of the wheel assembly opposite the photographed wheel by measuring the difference in the angle of inclination of the vehicle before and after loading using the accelerometer and the inclinometer of the smart communication device.

13. A smart communication device for estimating weight of a motor vehicle including a front wheel assembly and a rear wheel assembly after loading of the vehicle comprising:
    processing circuitry configured to identify the vehicle; and
    a camera configured to capture a photograph of at least one wheel of the vehicle after loading,
    wherein the processing circuitry is further configured to
       determine clearance of the wheel assembly of the photographed wheel as a function of the identified vehicle,
       determine clearance of the wheel assembly opposite the photographed wheel by measuring a difference in an angle of inclination of the vehicle before and after loading using at least one accelerometer or inclinometer of the smart communication device, the smart communication device being located within the vehicle before and after the loading,
       calculate a load value on the wheel assembly of the photographed wheel and a load value on the opposite wheel assembly as a function of respective clearances of the wheel assemblies to determine a total load value of the vehicle, and
       provide a load state of the vehicle to a user.

14. A non-transitory computer-readable medium having stored thereon computer-readable instructions which when executed by a computer cause the computer to perform a method for estimating weight of a motor vehicle including a front wheel assembly and a rear wheel assembly after loading of the vehicle, the method comprising:
    capturing and processing a photograph of at least one wheel of the vehicle after loading to determine clearance of the wheel assembly of the photographed wheel as a function of the identified vehicle;
    determining clearance of the wheel assembly opposite the photographed wheel by measuring a difference in an angle of inclination of the vehicle before and after loading using at least one accelerometer or inclinometer of the smart communication device, the smart communication device being located within the vehicle before and after the loading;
    calculating a load value on the wheel assembly of the photographed wheel and a load value on the opposite wheel assembly as a function of respective clearances of the wheel assemblies to determine a total load value of the vehicle; and
    providing a load state of the vehicle to a user.

* * * * *